Patented Feb. 23, 1937

2,071,836

UNITED STATES PATENT OFFICE 2,071,836

PIGMENTED COMPOSITION

Russell L. Jenkins, Anniston, Ala., assignor to Swann Research, Inc., a corporation No Drawing. Application February 29, 1932, Serial No. 595,959

13 Claims. (Cl. 106—40)

This invention relates to a new pigmented composition and coating composition made therefrom.

One object of this invention is to provide a pigmented composition in which opacity and hiding power is obtained by means of a chemically inert, non-livering, light-resistant body.

Well known means for producing opacity and hiding power in coating compositions of the organic plastic type consist in the addition of the known inorganic pigments such as zinc oxide, titanium oxide, lithopone, basic lead carbonate, etc. These pigments being inorganic in nature dissolve usually to a very slight degree resulting in the production of ions in solution due to hydrolysis of the dissolved substance. In many cases the dissolved substance results in the formation of ions, one type of which may be stronger than the other and consequently may result in the precipitation of colloidal matter in the coating composition. The livering of drying oil compositions by basic pigments is apparently an effect of this nature.

Even if the pigment as prepared is neutral, the action of sunlight, air and moisture during exposure alters the pigment in a coating to a greater or less degree, often causing accelerated failure.

In experiments to overcome these difficulties with the white pigments I have discovered that if a highly chlorinated or brominated diphenyl or polyphenyl be finely divided it may be incorporated in plastic cellulosic bodies and highly resistant pigmented or opaque coating composition obtained. A chlorinated diphenyl having more than 68 percent chlorine, preferably in the neighborhood of 69 percent is suitable for this purpose. Such a chlorinated diphenyl has an average composition corresponding to the formula: $C_{12}HCl_9$.

My improved product can be economically produced by reacting directly on diphenyl at atmospheric pressure with chlorine using a chlorination catalyst such as iron. The material after having been chlorinated to a chlorine content in the neighborhood of 69% is distilled either in a vacuum or under atmospheric pressure.

Specifically chlorinated diphenyl of sufficiently high chlorine content for my pigment is produced as follows: A stream of chlorine gas is passed through a mass of molten diphenyl containing pieces of iron which act catalytically to accelerate the reaction, the temperature being maintained above the melting point of the mass being chlorinated. Chlorination is continued until the product contains in the neighborhood of 69% and less than 70% chlorine, the final melting range of the product being 190 to 250° C. The chlorinated mass is now distilled at atmospheric or reduced pressure, the distillation temperature being above 400° C. The product thus obtained consists of a yellow to white dense crystalline solid having an approximate chemical composition, which is represented by the formula: $C_{12}HCl_9$. It has a specific gravity of 1.9 and an average refractive index of 1.72. It is practically insoluble in cold benzol and only moderately soluble in hot benzol.

Brominated diphenyl suitable for my purpose is made in similar manner to that above, bromination being continued until the product contains between 82 to 84% of bromine. This product has a specific gravity of 3.02, a refractive index of 1.82, and a chemical composition varying between and including that expressed by the formulae: $C_{12}H_3Br_7$ and $C_{12}H_2Br_8$.

In order to prepare my material for use as a pigment it is finely ground first in an ordinary mill, then passed one or more times through a colloid mill. The product thus obtained should have a particle size of the order of 1.0 to 0.5 micron (.001 to .0005 m. m.).

In order to more readily understand my invention it is necessary that a distinction be drawn between various types of halogenated aromatic hydrocarbons, particularly chlorinated diphenyl. The type of chlorinated diphenyl which is resinous contains somewhat less chlorine, usually up to 60% or 65% by weight of chlorine, than does my new pigment which contains upwards of 67 or 68% chlorine. This small difference in chlorine content causes a great difference in behavior and properties. The lower chlorinated resinous product is useful because of its compatibility with ordinary oleoresinous varnish oils. (See Gardner British Pat. 351,637). My higher chlorinated or brominated diphenyl pigment is not compatible with such varnishes and in fact is insoluble in all the ordinary varnish or lacquer solvents. This discovery has enabled me to prepare the various pigmented compositions herein disclosed.

My improved pigment may be incorporated in various ways, a few of which are described below:—

*As a lacquer pigment.*—A lacquer usually consists of a volatile and non-volatile part. The volatile part in a good formula may be:

| | Percent |
|---|---|
| Butyl acetate | 50 |
| Alcohol | 15 |
| Toluol | 35 |
| | 100 |

The non-volatile part may consist of:

| | Parts |
|---|---|
| Nitrocellulose ½ second | 12 |
| Dammar | 8 |
| Castor oil | 4 |
| Diethyl phthalate | 4 |
| Chlorinated diphenyl pigment | 15 |

The compounding of the complete lacquer is carried out in known manner. As in the case of the other organic plastics, I may employ combinations of several known pigments with my new chlorinated diphenyl body. For example for white plastics I may employ zinc oxide in combination, while for colored plastics appropriate proportions of colored pigments may be similarly combined.

*Pigmented cellulose ester plastics.*—In the production of opaque or translucent films or threads from cellulose esters or ethers I have found my finely divided chlorinated diphenyl to be of extreme usefulness. For example a nitrocellulose composition satisfactory for forming sheets or films may have the following composition:

| | Parts |
|---|---|
| Nitrocellulose (low viscosity) | 50 |
| Gum dammar | 34 |
| Tricresyl phosphate | 12 |
| Chlorinated diphenyl (69% chlorine) | 4 |

These ingredients are compounded in the usual way by means of a solvent and may then be cast into sheets in known manner.

My invention may also be applied to the production of opaque or translucent fibers for the production of artificial silk. If a cellulose nitrate fiber is to be made by the dry-spinning process the nitrocellulose with a nitrogen content of 11.3 to 12.5% is made to form the spinning solution by dissolving say 18 to 25 parts in 82 to 75 parts of a solvent containing say 60% of ether and 40% of alcohol. To the spinning solution is now added 8 parts of finely divided chlorinated diphenyl of about 69% chlorine content to 92 parts of contained cellulose nitrate, dispersion being effected in known manner. The cotton solution is now spun and denitrated in the usual way, the chlorinated diphenyl because of its chemical resistance being unaffected by the reagents used in this process.

Because of the greater refractive index of the brominated diphenyls it may be found desirable to substitute a brominated diphenyl in place of the chlorinated diphenyl, and a greater opacity of the fiber obtained. A brominated diphenyl of 80 to 85% bromine content and in finely divided form will be found suitable.

In analogous manner I may incorporate either a finely divided chlorinated or brominated diphenyl in a cellulose xanthate solution from which the viscose solution is to be prepared. In this process the cellulose xanthate solution is prepared in known manner and subsequently diluted with a weak caustic soda solution so that the final solution contains in the neighborhood of 7% of cellulose. The finely divided halogenated diphenyl may be dispersed in the weak caustic soda solution or in the diluted viscose in the proportion to give from 4 to 10% based on the cellulose contents of the viscose solution.

In similar manner my halogenated diphenyl pigment may be incorporated in other cellulose ester or regenerated cellulosic bodies such as cellulose acetate or in cuprammonium silk, since it has been found to be chemically inert and therefore resistant to the usual chemical reagents employed in the manufacture of these products.

While I have described several embodiments of my invention, it will be apparent to those skilled in the art that it is not so limited, but that it is susceptible of various changes and modifications without departing from the spirit thereof, and I desire that only such limitations shall be placed thereupon as may be imposed by the prior art or as are specifically set forth in the appended claims.

I claim:

1. Process of producing translucency in organic plastic compositions consisting in incorporating with the plastic a highly halogenated diphenyl.

2. Process of producing translucency in organic plastic compositions consisting in incorporating with the plastic while in a fluid state a finely divided highly halogenated diphenyl selected from the group consisting of chlorinated diphenyl and brominated diphenyl.

3. Process of producing translucency in organic oleo-resinous compositions consisting in incorporating with said compositions while in a fluid state a finely divided highly halogenated diphenyl selected from the group consisting of chlorinated diphenyl and brominated diphenyl.

4. Process of producing translucency in regenerated cellulosic fibers comprising incorporating with said compositions while in the plastic stage a finely divided highly halogenated diphenyl selected from the group consisting of chlorinated diphenyl and brominated diphenyl.

5. An opaque to translucent organic plastic composition containing a halogenated diphenyl selected from the group consisting of chlorinated diphenyl and brominated diphenyl.

6. An opaque to translucent cellulosic fiber containing a highly halogenated diphenyl selected from the group consisting of chlorinated diphenyl and brominated diphenyl.

7. An opaque to translucent regenerated cellulosic fiber containing a highly halogenated diphenyl selected from the group consisting of chlorinated diphenyl and brominated diphenyl.

8. An opaque to translucent regenerated cellulosic fiber containing a highly chlorinated diphenyl of more than 68% chlorine content.

9. An opaque to translucent regenerated cellulosic fiber containing a dispersed highly chlorinated diphenyl of more than 68% and less than 70% chlorine content.

10. An opaque to translucent regenerated cellulosic fiber containing as an opacifying agent a dispersed highly chlorinated diphenyl of more than 68% and less than 70% chlorine content.

11. An opaque to translucent regenerated cellulosic fiber containing as an opacifying agent a dispersed highly brominated diphenyl.

12. As a new article of manufacture, delustered viscose rayon containing chlorinated diphenyl.

13. As a new article of manufacture, delustered rayon containing chlorinated diphenyl.

RUSSELL L. JENKINS.